(12) United States Patent
Thyagarajan et al.

(10) Patent No.: US 12,113,462 B2
(45) Date of Patent: Oct. 8, 2024

(54) ELECTRIC DRIVE SYSTEMS USING IMPEDANCE SEPARATION AND IMPEDANCE SHAPING

(71) Applicants: Deere & Company, Moline, IL (US); Wisconsin Alumni Research Foundation, Madison, WI (US)

(72) Inventors: Lav Thyagarajan, West Fargo, ND (US); Giri Venkataramanan, Madison, WI (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/939,593

(22) Filed: Sep. 7, 2022

(65) Prior Publication Data
US 2023/0179133 A1 Jun. 8, 2023

Related U.S. Application Data

(60) Provisional application No. 63/333,779, filed on Apr. 22, 2022, provisional application No. 63/265,136, filed on Dec. 8, 2021.

(51) Int. Cl.
G05B 5/00 (2006.01)
H02P 23/00 (2016.01)
H02P 23/14 (2006.01)

(52) U.S. Cl.
CPC .......... *H02P 23/14* (2013.01); *H02P 23/0022* (2013.01)

(58) Field of Classification Search
CPC .. H02P 23/14; H02P 23/0022; H02P 21/0017; H02P 21/05; H02P 23/04
See application file for complete search history.

(56) References Cited

U.S. PATENT DOCUMENTS 5,892,198 A * 4/1999 Barnes .............. H01J 37/32082
219/709

FOREIGN PATENT DOCUMENTS

| CN | 101873110 A | * | 10/2010 | |
| CN | 103038444 A | * | 4/2013 | ........... E21B 47/122 |
| EP | 2621752 B1 | | 7/2019 | |

OTHER PUBLICATIONS

Aguirre-Ollinger Gabriel et al., An admittance shaping controller for exoskeleton assistance of the lower extremities, Autonomous Robots, Kluwer Academic Publishers, Dordrecht, NL, vol. 40, No. 4, Aug. 19, 2015, pp. 701-728, DOI: 10.1007/S10514-015-9490-8.
Extended European Search Report and Written Opinion issued in European Patent Application No. 22197475.1, dated Apr. 28, 2023, in 07 pages.
Kambrath et al., Dynamic Study of Electromechanical Interaction in Marine Propulsion, 2016 IEEE Energy Conversion Congress and Exposition (ECCE), 2016, pp. 1-8 [online][retrieved on May 14, 2024]. Retrieved from ieeexplore.ieee.org.
Jezierski et al., On Electrical Analogues of Mechanical Systems and their Using in Analysis of Robot Dynamics, Proceedings of the Second International Workshop on Robot Motion and Control, RoMoCo'01 (IEEE Cat. No. 01EX535), Oct. 2007, pp. 391-404.

(Continued)

*Primary Examiner* — Karen Masih
(74) *Attorney, Agent, or Firm* — Harness, Dickey & Pierce, P.L.C.

(57) ABSTRACT

One or more example embodiments provide systems and methods for using impedance separation and impedance shaping.

17 Claims, 7 Drawing Sheets

(56) References Cited

OTHER PUBLICATIONS

Luczak et al., Mathematical model of multi-mass electric drive system with flexible connection, 2014 19th International Conference on Methods and Models in Automation and Robotics (MMAR), Oct. 2014, pp. 590-595.

Zhao et al., Off-Vehicle Evaluation of Active Oscillation Damping Schemes, IEEE Journal of Emerging and Selected Topics in Power Electronics, vol. 2, No. 2, pp. 665-672, 2014. [online][retrieved on Jan. 26, 2021]. Retrieved from ieeexplore.ieee.org.

Li et al., Robust Oscillation Suppression Control of Electrified Powertrain System Considering Mechanical-Electric-Network Effects, IEEE Access, vol. 8, Mar. 20, 2020, pp. 56441-56451.

Gendrin et al., An Impedance Control using a Finite Control Set Model Predictive Controller, 2015 IEEE International Symposium on Predictive Control of Electrical Drives and Power Electronics (PRECEDE), 2015, 85-90. [online][retrieved on May 14, 2024]. Retrieved from ieeexplore.ieee.org.

Middlebrook et al., Input Filter Considerations in Design and Application of Switching Regulators, No. 7, pp. 91-107, 1983.

Szabat et al., Vibration Suppression in a Two-Mass Drive System Using PI Speed Controller and Additional Feedbacks-Comparative Study, IEEE Transactions on Industrial Electronics, vol. 54, No. 2, Apr. 2007, pp. 1193-1206. [online][retrieved on Feb. 6, 2021]. Retrieved from ieeexplore.ieee.org.

\* cited by examiner

FIG. 2B

ELECTRIC DRIVE SYSTEMS USING IMPEDANCE SEPARATION AND IMPEDANCE SHAPING

CROSS REFERENCE TO RELATED APPLICATIONS

The present application hereby claims priority under 35 U.S.C. § 119 to U.S. Provisional Application No. 63/265,136 filed Dec. 8, 2021, and U.S. Provisional Application No. 63/333,779, filed Apr. 22, 2022, the entire contents of each of which are hereby incorporated by reference.

BACKGROUND

Development of electric drives often includes an analysis of dynamic phenomena of interactions between various components that form a powertrain, which may include several inertia elements and compliance elements with some damping. Selection of powertrain components are done to reduce and/or minimize undamped oscillatory responses during various load transients on the powertrain.

Mechanical systems can be modeled by using electrical analogs to analyze dynamic properties and to design systems. The wide availability of computer based simulation and hardware-in-loop engineering tools such as MATLAB™, SIMULINK™ and Simscape™ computer software, which are trademarks of The MathWorks, Inc., of Natick Massachusetts, have broadened the use of model-based control approaches. These engineering tools enable modeling and designing systems across multiple physical domains such as electro-mechanical systems.

SUMMARY

In accordance with one aspect of the disclosure, a drive system comprises a load machine and a coupler. An electric machine is coupled to the load machine via the coupler and configured to drive the load machine. A controller is configured to control the electric machine based on a target shaping of impedance control parameters (e.g., by a kernel impedance control parameter) of the drive impedance versus frequency response (e.g., a target shaping of magnitude, phase or both of the drive impedance versus frequency response) of the electric machine and/or based on an impedance (e.g., fixed or constrained impedance versus frequency response) of the load machine and the coupler.

In accordance with another aspect of the disclosure, the controller is configured to select and tune control parameters that are derived from modeling an interconnection of an electro-mechanical system, such as a motor drive to a complex mechanical load or an electric machine (e.g., generator), as a complex electrical network. Because the electro-mechanical system can include intentional and unintended feedback paths that can lead to instabilities, motor drive systems with torsional loads impose constraints and challenges on control parameters of the electric machine, such as the dynamic performance of speed control.

In accordance with a yet another aspect of the disclosure, various control strategies have been developed to overcome the technical issues, such as feedback paths, that are illustrated using a two-inertia model of the electro-mechanical system, representing the simplest model of a compliant interconnected electromechanical system.

Some example embodiments provide systems and methods for using impedance separation and impedance shaping.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For the purposes of clarity, various dimensions of the drawings may have been exaggerated.

FIG. 2 illustrates sections of FIGS. 2A and 2B;

DETAILED DESCRIPTION

Figure 1:
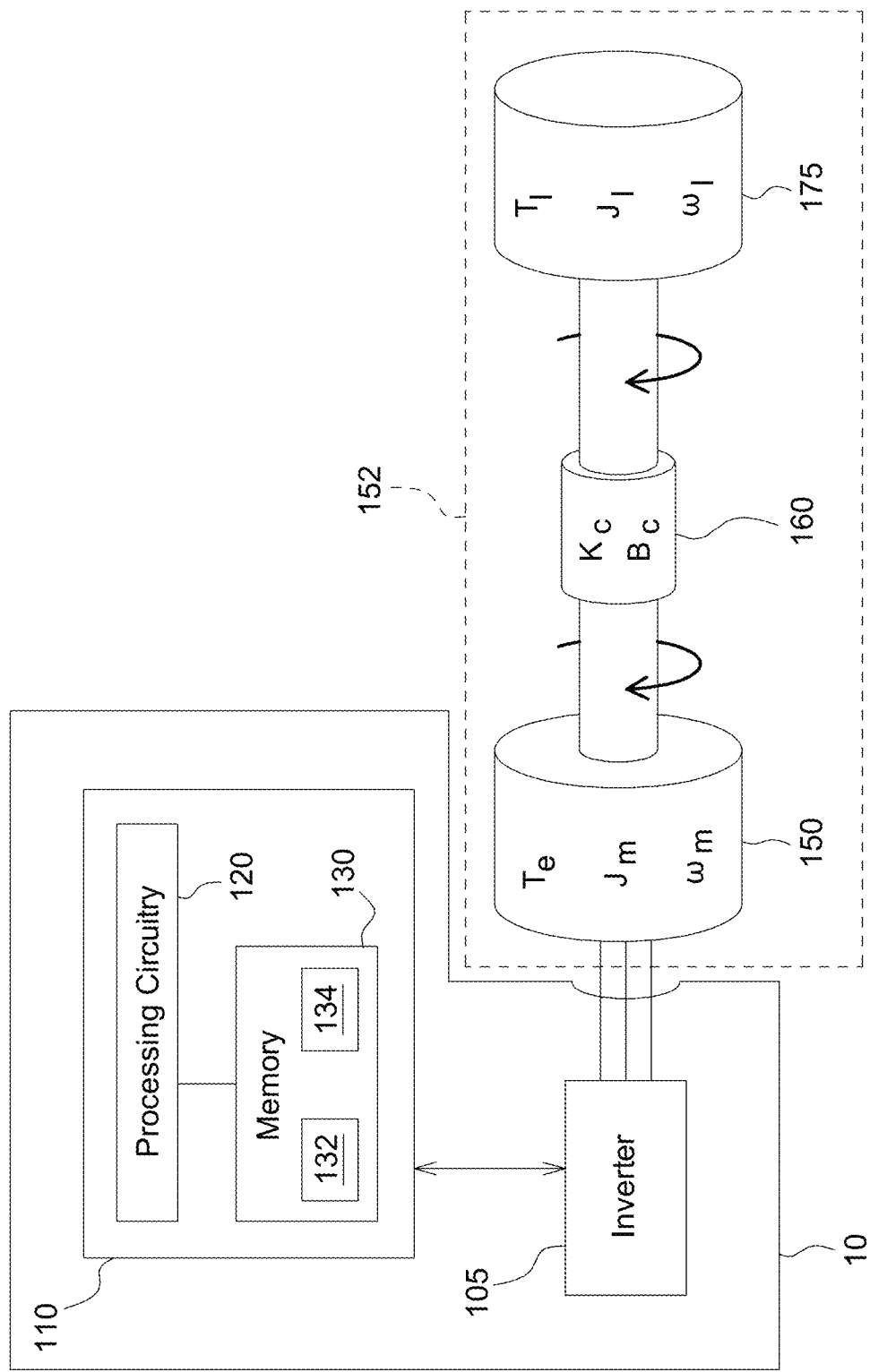
FIG. 1 illustrates a schematic of an electric drive connected to a mechanical load according to an example embodiment.

As shown in FIG. 1, an electric drive 10 includes an inverter 105 and a controller 110 to generate commands (e.g., voltage and/or current commands) for an electric machine 150 (e.g., a motor). The electric machine 150 is part of a modeled electro-mechanical system 152. In addition to the electric machine 150, the modeled electro-mechanical system 152 includes a mechanical load 175 and a coupler 160. The electric machine 150 is coupled to the mechanical load 175 though the coupler 160 (e.g., a compliant coupler modelled by stiffness and damping properties). The coupler 160 comprises a mechanical, rotational coupler, such as a flexible coupler, a bellows coupler, a flexible joint, a universal joint, a flange coupler, a gearbox, or a transmission, for example. The electric machine 150 is configured to drive the mechanical load 175 based on the commands provided to the electric machine 150 from the controller 110.

In some example embodiments, the controller 110 includes processing circuitry 120 and memory 130. The controller 110 is configured to perform the methods and algorithms described herein. In some example embodiments, the processing circuitry 120 is configured to execute instructions stored in the memory 130 to cause the electric drive 10 to perform the methods and algorithms described herein.

The term 'processing circuitry,' as used in the present disclosure, may refer to, for example, hardware including logic circuits; a hardware/software combination such as a processor executing software; or a combination thereof. For example, the hardware more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to some example embodiments, the memory 130 may be a tangible, non-transitory computer-readable medium, such as a Random Access Memory (RAM), a flash memory, a Read Only Memory (ROM), an Electrically Programmable ROM (EPROM), an Electrically Erasable Programmable ROM (EEPROM), registers, a hard disk, a removable disk, a Compact Disk (CD) ROM, any combination thereof, or any other form of storage medium known in the art.

In at least some example embodiments, the controller is configured to control the electric machine further based on a feedback impedance.

In at least some example embodiments, the controller is configured to determine the drive impedance of the electric machine based on a first impedance of the electric machine and the feedback impedance.

In at least some example embodiments, the controller is configured to determine crossing frequencies (of an impedance magnitude versus frequency and of an impedance phase versus frequency) at which a frequency response function (FRF) of the drive impedance of the electric machine and a FRF of the impedance of the mechanical load (e.g., load machine) and a coupler cross each other, and determine the drive impedance based on the determined frequencies. A FRF for a modeled electro-mechanical system that comprises an electric machine 150 (e.g., an electric motor or drive electric machine operational in motoring mode), a mechanical (rotational) coupler 160 and a mechanical load 175 (e.g., drivetrain of a ground vehicle with wheels or tracks that engage the ground, or a generator load or electric machine load operational in a generating mode) may be defined as one or more of the following: (a) a magnitude of impedance versus frequency response ($Z_{EM}(s)$) of an electric machine, (b) a magnitude of impedance versus frequency response of the mechanical load ($Z_{CL}(s)$), (c) a (magnitude) control parameter or kernel magnitude versus frequency response ($Zk(s)$) for an electronic controller, and (d) a target or shaped magnitude of impedance versus frequency response of the electric machine ($Z_{EM}(s)$), (e) a phase of impedance versus frequency response ($Z_{EM}(s)$) of an electric machine, (f) a phase of impedance versus frequency response of a mechanical load ($Z_{CL}(s)$), (g) a (phase) control parameter or kernel magnitude versus frequency response ($Zk(s)$) for an electronic controller, and (d) a target or shaped phase of impedance versus frequency response of the electric machine ($Z_{EM\_shaped}(s)$), which are described in greater detail in FIG. 5.

In at least some example embodiments, the controller is configured to determine the drive impedance such that a FRF of the determined impedance does not cross the FRF of the impedance of the load machine and a coupler.

Referring to FIG. 1, mechanical resonance may be caused by the combination of compliant couplings and high gains on a drive to meet the high-performance demands. The compliance comes from the mechanical interconnections like shafts, couplers and gearboxes. If the inertia of the coupler 160 is small compared to the electric machine 150 and the load 175, the stiffness can be lumped into a single spring that connects the motor and load as shown in FIG. 1. The time domain dynamic motion for the system of FIG. 1 may be:

$$J_m \frac{d\omega_m}{dt} = T_e - K_C(\theta_m - \theta_l) - B_C(\omega_m - \omega_l) \quad (1)$$

$$J_l \frac{d\omega_l}{dt} = T_l + K_C(\theta_m - \theta_l) + B_C(\omega_m - \omega_l) \quad (2)$$

where $T_e$, $J_m$, $\omega_m$ and $\theta_m$ are electro-mechanical torque, inertia, mechanical speed and phase values, respectively, of the electric machine 150, $T_l$, $J_l$, $\omega_l$ and $\theta_l$ are electro-mechanical torque, inertia, mechanical speed and phase values, respectively, of the load 175, and Kc and Bc are a stiffness and a damping, respectively, of the coupler 160.

A transfer function from the electro-mechanical torque $T_E$ to a load velocity, $\Omega_L$ can then be derived from Equations 1 and 2 by using Laplace transforms to transition into the frequency domain and then use algebra to derive the transfer function as follows:

$$\frac{\Omega_L}{T_e} = \frac{1}{s} \frac{1}{(J_m + J_l)} \frac{J_m s^2 + b_c s + K_c}{(J_m || J_l) J_l s^2 + b_c s + K_c} \quad (3)$$

However, the transfer function in Equation (3) does not provide insight into some system design parameters. Furthermore, there is no insight in terms of energy exchange between the electrical and mechanical domains.

Accordingly, at least some example embodiments use impedance-separation and impedance-shaping for electro-mechanical systems to improve dynamics during transients arising from interactions among interconnected systems. Impedance-shaping provides designs with adequate impedance margins to mitigate any potential resonances.

Figure 2A:
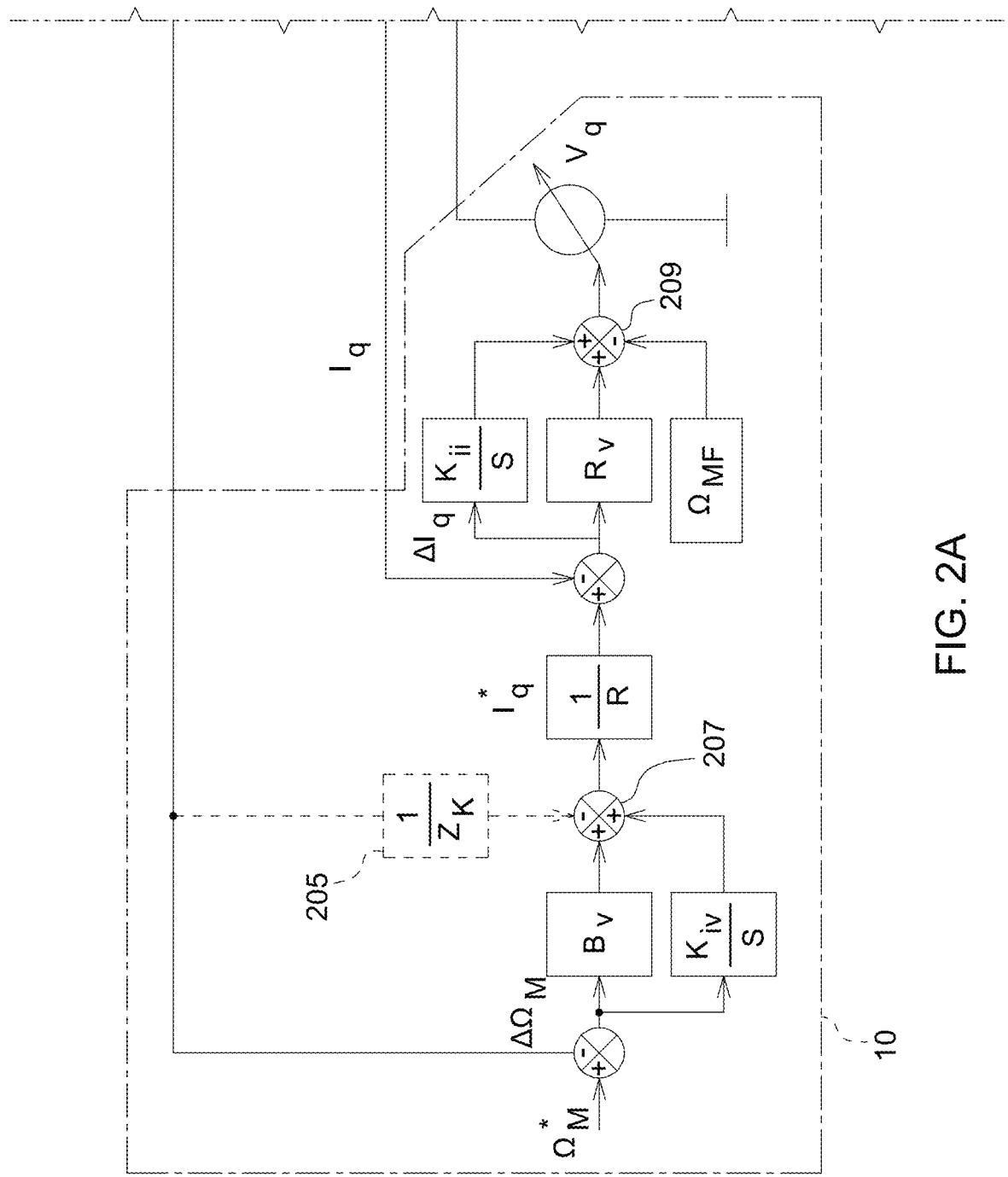
FIGS. 2A-B illustrate an equivalent circuit and block diagram of the schematic shown in FIG. 1.

FIGS. 2A and B illustrate an equivalent circuit and block diagram of the schematic shown in FIG. 1 according to at least one example embodiment.

As shown in FIGS. 2A and B, the controller 110 obtains a mechanical velocity command $\Omega_M^*$ and reduces the mechanical velocity command $\Omega_M^*$ by a filtered speed $\Omega_{MF}$ (e.g., filtered by a position sensor) to generate a command difference $\Delta\Omega_M$.

The controller 110 multiplies the command difference $\Delta\Omega_M$ by a proportional gain of a speed controller 132 (e.g., software based proportion-integral control instructions stored in memory 130 and executed by the processing circuitry 120) $B_v$ and multiplies the command difference $\Delta\Omega_M$ by an integral gain of the speed controller 132 (within the controller 110) $K_{iv}$ divided by s, where s is the Laplace representation of an excitation frequency j$\omega$. The two products ($\Delta\Omega_M B_v$ and $\Delta\Omega_M(K_{iv}/s)$) are summed by the controller 110. The controller 110 subtracts the sum by an output of an impedance shaper 202 (which is part of the controller 110) at adder 207. The function of the impedance shaper 202 may be performed by the processing circuitry 120 executing instructions stored in the memory 130. The impedance shaper is described in greater detail below.

The controller 110 generates a current command $I_q^*$ by multiplying the output of the adder 207 by 1/$\hat{K}$, where $\hat{K}$ is an estimate of a motor constant K. The estimate $\hat{K}$ may be provided by a supplier or determined using a torque constant and back EMF (electro-motive force) constant. The controller 110 determines a difference $\Delta I_q$ between the current command $I_q^*$ and a sensed current $I_q$.

The controller 110 multiplies the difference $\Delta I_q$ by a proportional gain $R_v$ for a current controller 134 (e.g., software based proportion-integral control instructions stored in memory 130 and executed by the processing circuitry 120) and the difference $\Delta I_q$ by a gain of the current controller 134 (within the controller 110) an integral gain $K_{ii}$ for the current controller 134 divided by s.

The two products ($\Delta I_q R_v$ and $\Delta I_q(K_{ii}/s)$) are summed by the controller 110 and added to a back EMF decoupling $\hat{K}$ $\Omega_{MF}$ at adder 209. The output of the adder 209 is quadrature voltage $V_q$ applied to the electric machine 150.

The model of the electric machine 150 includes a per phase stator resistance $R_s$, a q-axis current $I_q$, a q-axis motor inductance $L_q$, a back emf of the motor $K\Omega_M$, a damping $B_M$ of the electric machine 150, an inertia $J_M$, a mechanical impedance $Z_{JM}$ and an impedance $Z_{BM}$ of the electric machine 150 for viscous damping.

The coupler 160 is modeled with the stiffness $K_c$ and the damping $B_c$ in parallel and the load 175 is modeled with the damping $B_L$ and the inertia $J_L$ in parallel.

In some example embodiments, the stator resistance $R_s$ of the electric machine 150 may be 170mΩ, the inductance $L_q$ of the electric machine 150 may be 0.8 mH, the inertia $J_M$ may be 22.5 mg-m², the inertia $J_L$ may be 22.5 mg-m², the damping $B_M$ of the electric machine may be the same as the damping $B_c$ of the coupler 160 which may be $$.11 \frac{mNm-s}{rad},$$

the damping $B_L$ of the load 175 may be $$1 \frac{mNm-s}{rad},$$

the stiffness $K_C$ of the coupler 160 may be $$58 \frac{Nm}{rad},$$

the virtual resistance $R_v$ of the controller 110 may be 7.5Ω, the proportional and integral gains $K_{ii}$ of the current controller 134 may be 14 kA·sΩ, the damping of the electric drive 10 may be $$.5 \frac{mNm-s}{rad},$$

and the proportional and integral gains $K_{iv}$ of the speed controller 132 may be $$.002 \frac{mNm}{rad}.$$

Figure 2B:
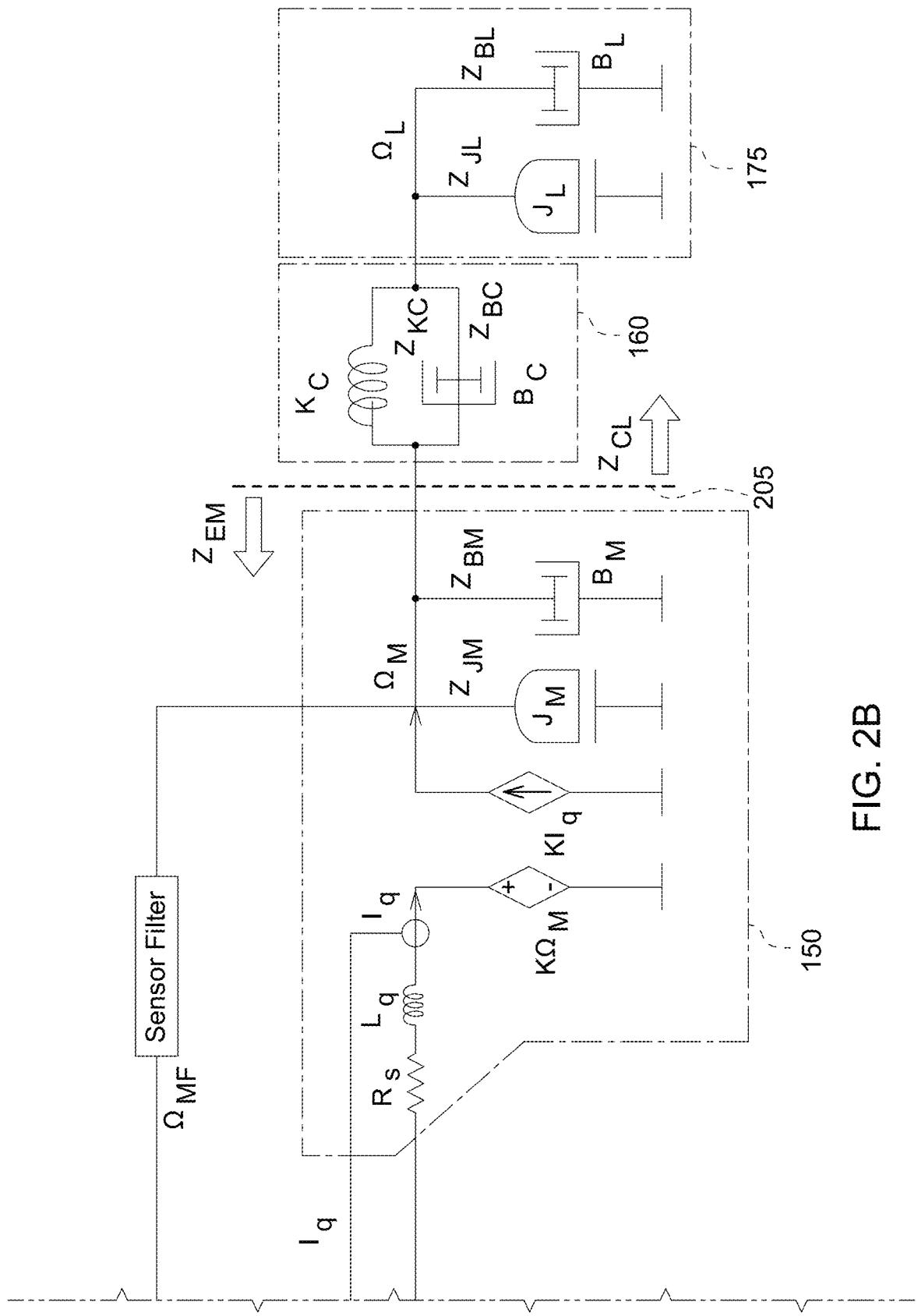

In addition, the block diagram of FIGS. 2A-2B includes impedances including the mechanical impedance $Z_{JM}$ and impedance $Z_{BM}$ of the electric machine 150, a mechanical impedance $Z_{JL}$ of the load 175, an impedance of stiffness $Z_K(s)$, an impedance of viscous damping $Z_{BC}$ for the coupler and an impedance of viscous damping $Z_{BL}$ for the load.

Representation of the constitutive properties of the lumped parameters using operational impedances represented by complex quantities with a magnitude and phase allows the determination of the frequency response of the circuits to steady state sinusoidal excitation voltages and/or currents. Mechanical equivalent circuits can be similarly used for a graphical representation of rotational mechanical systems with interconnections of components with an equivalent complex variable abstraction of their velocity Ω—torque T relationships.

Mechanical impedance may be reflected as a ratio of $Z_m=\Omega(s)/T(s)$ where s is the Laplace representation of the excitation frequency jω.

The rotational inertia of J kgm² has a mechanical impedance of $Z_J=1/Js$, the rotation spring of $$K \frac{Nm}{rad}$$

has a mechanical impedance of $Z_K(s)=s/K$ and the rotational viscous damping of $$B \frac{Nms}{rad}$$

has a mechanical impedance of $Z_B=1/B$.

Using impedances, dynamic stability properties of an interconnection of a mechanical power source (e.g., torque source or speed source) to a mechanical load can be examined by modeling an internal impedance of the power source (e.g., the electric machine 150) and comparing it with the mechanical impedance of a load (e.g., the load 175).

In at least some example embodiments, the overall system is partitioned into two subsystems. In the system shown in FIGS. 2A-2B, the partition occurs at dashed line 205. Following the partitioning, an impedance $Z_{EM}$ is determined by looking to the left of the dashed red line and an impedance $Z_{CL}$ is determined by looking to the right of the dashed line. It should be understood that the partitioning point can be anywhere along the system, certain points make the analysis insightful in developing the design. In some example embodiments, a preference is to determine if there are issues when interconnecting a first system (e.g., the electric machine 150) with another system (e.g., the load 175).

Figure 3:
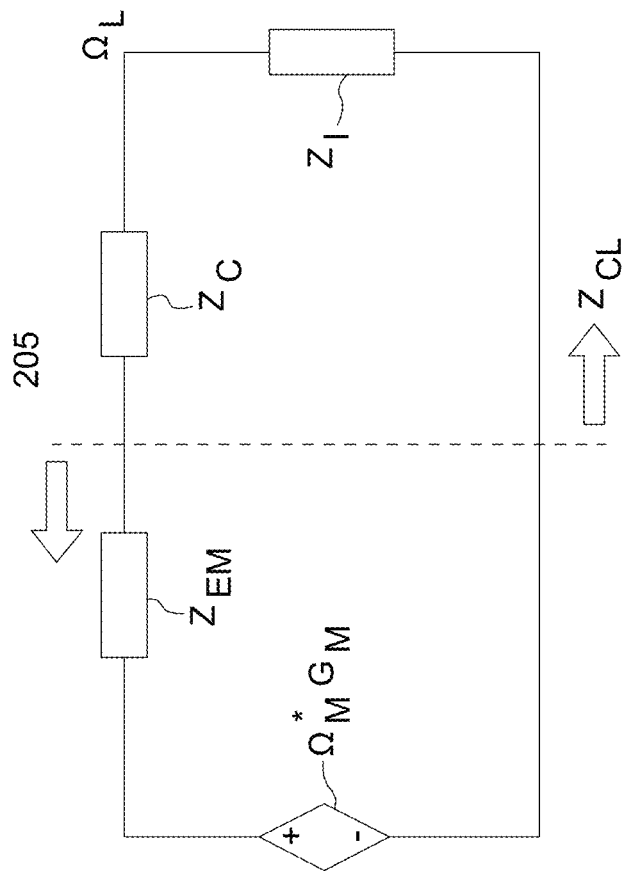
FIG. 3 illustrates a mechanical equivalent circuit of the system shown in FIGS. 2A-2B.

FIG. 3 illustrates a mechanical equivalent circuit of the system shown in FIGS. 2A-2B.

As shown in FIG. 3, $\Omega_M^* G_M$ is a dependent speed source that represents the speed $\Omega_M$ of the electric machine 150 where $\Omega_M^*$; is the command speed and $G_M$ represents a closed loop transfer function $\Omega_M/\Omega_M^*$.

$\Omega_L$ is a speed of the load 175. The electromechanical impedance $Z_{EM}$ includes the electrical and mechanical impedances of the electric machine 150, current regulator impedance, back EMF decoupling and speed controller 132 impedances. The impedance $Z_{CL}$ includes the impedance $Z_C$ of the coupler 160 and the impedance $Z_l$ of the load 175. The partition enables a designer to focus on the impedances separately without the need to derive complete closed loop transfer functions.

A load speed to speed command transfer function can be written as $$\frac{\Omega_L}{\Omega_M^*} = \frac{T_M}{1+T_M} \frac{ZEM/Zc}{1+ZEM/Zc} \frac{Zcl/ZEM}{1+ZCL/ZEM} \qquad (4)$$

where $$\frac{T_M}{1+T_M} \quad (5)$$

is a closed loop transfer function $G_M$.

An impedance ratio $Z_{EM}/Z_{cL}$ may be referred to as an interconnection loop gain $T_I$. A load loop gain is $T_{CL}=Z_{EM}/Z_{CL}$ and the drive loop gain is $T_M$. Consequently, an overall closed loop transfer function is a product of three loop gains and may be written in closed loop gain form as:

$$\frac{\Omega_L}{\Omega_M^*} = G_M G_{CL} G_I \quad (5)$$

wherein $G_I$ is a closed loop interconnection gain, $G_{LC}$ is a closed loop load-coupler gain and $G_M$ is a closed loop motor gain.

In particular, if $Z_R > Z_L$, $Z_I > Z_c$ and $T_M \gg 1$ then the closed loop interconnection gain $G_I$, closed loop load-coupler gain $G_{LC}$ and closed loop motor gain $G_M$ will be unity, and the stability of the interconnected system occurs.

In some example embodiments an impedance separation strategy may be used (e.g., partitioning into $Z_{EM}$ and $Z_{CL}$), an examination of the frequency response functions $Z_{EM}$ and $Z_{CL}$ is performed to ensure there is at least 15 dB separation, which results in a unity closed loop interconnection gain $G_I$. In some examples, the load inertia is reduced to $J_L = 2.25$ mg–m² to enforce separation and keeping all other parameters unchanged.

In other example embodiments, separation between the drive impedance $Z_{EM}$ and the load impedance $Z_{CL}$ is performed by the impedance shaper 202. More specifically, kernel impedance may be used to enforce separation between the impedances $Z_{EM}(s)$ and $Z_{CL}(s)$.

Figure 4:
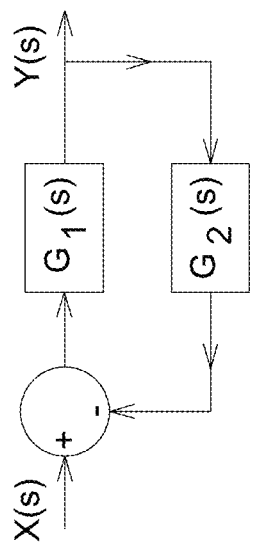
FIG. 4 illustrates a block diagram illustrating paralleling of feedback gain according to an example embodiment.

FIG. 4 illustrates a block diagram illustrating paralleling of feedback gain. In the system shown in FIG. 4, X(s) is an input and Y(s) is an output with a forward path gain $G_1(s)$ and a negative feedback gain $G_2(s)$. The transfer function is $$\frac{Y(s)}{X(s)} = \frac{G_1(s)}{(1+G_1(s)G_2(s))}, \quad (6)$$

which shows $$\frac{Y(s)}{X(s)} = \frac{G_1(s)\frac{1}{G_2(s)}}{\frac{1}{G_2(s)} + G_1(s)}, \quad (7)$$

and is equivalent to $$\frac{Y(s)}{X(s)} = G_1(s) \| \frac{1}{G_2(s)} \quad (8)$$

Extending the concept to the systems in FIGS. 2 and 3, the electromechanical impedance is $$\frac{\Omega_M(s)}{T_M(s)} \quad (9)$$

Thus, X(s) becomes $T_M(s)$ and Y(s) becomes $\Omega_M(s)$ with the drive impedance $Z_{EM}(s)$ being the gain $G_1(s)$ before impedance shaping and $G_2(s)$ becomes a reciprocal of the kernel impedance, which is $1/Z_K(s) = Y_K(s)$. The reciprocal of the kernel impedance $Y_K(s)$ accounts for the input being the motor speed $\Omega_M(s)$ and output is torque, which appears similar to admittance. Thus, $$\frac{\Omega_M(s)}{T_M(s)} = \frac{Z_{EM}(s)\frac{1}{Y_K(s)}}{Z_{EM}(s) + \frac{1}{Y_K(s)}} = Z_{EM}(s) \| \frac{1}{Y_K(s)} \quad (10)$$

For a gain in the feedback between $\Omega_M(s)$ and torque command input $T_M(s)$, the reciprocal of that gain appears in parallel with the original output impedance of the drive. If the kernel impedance $Z_K(s)$ is larger than the drive impedance $Z_{EM}(s)$ then the drive impedance $Z_{EM}(s)$ dominates the overall impedance and vice-versa. Hence, the designer has the freedom to choose the dominating impedance in the frequencies of interest.

Figure 5:
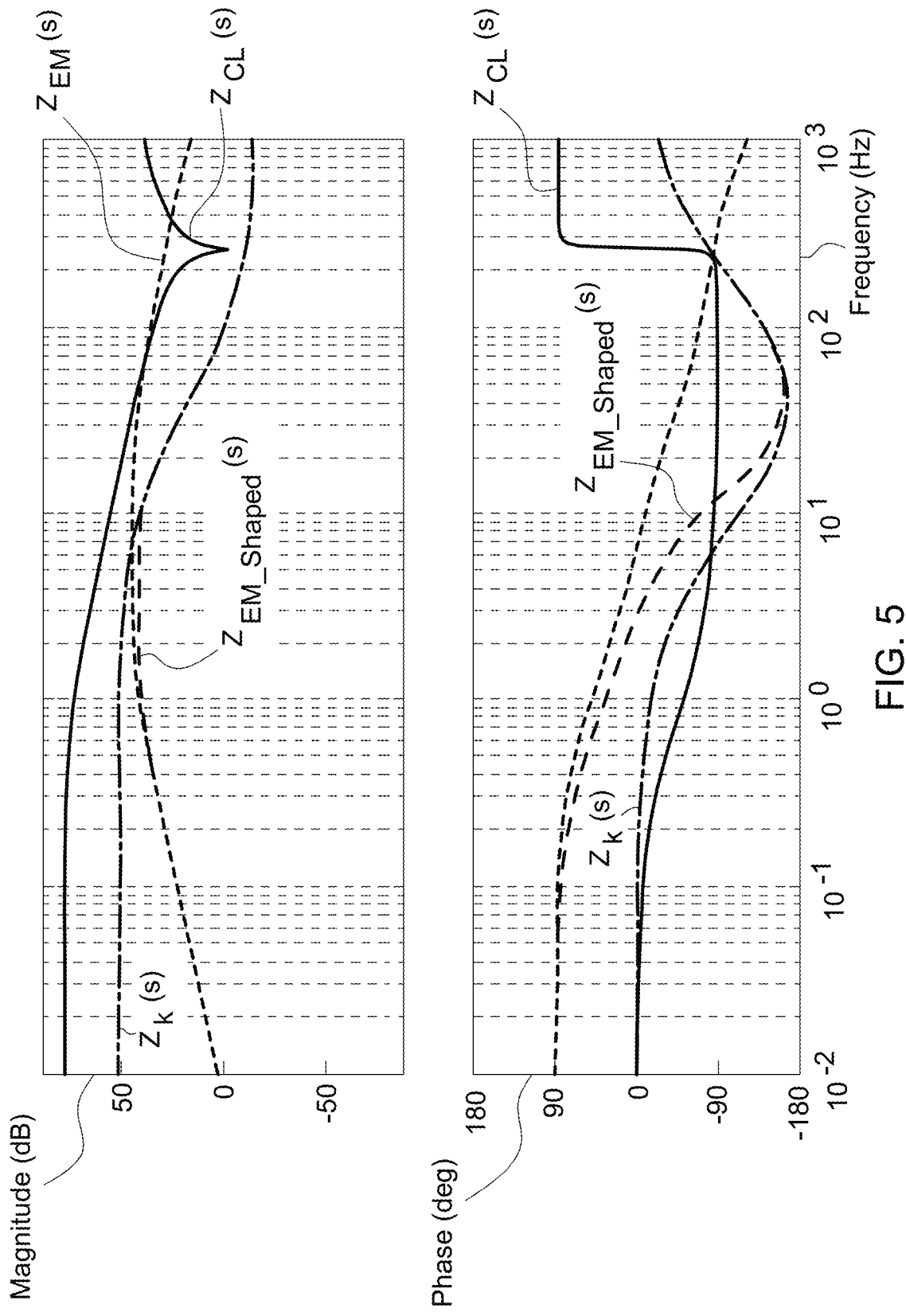
FIG. 5 illustrates frequency response functions of a drive impedance without kernel shaping, a drive impedance with kernel shaping and a load impedance according to an example embodiment.

FIG. 5 illustrates frequency response functions over a targeted bandwidth (e.g., on a logarithmic scale such as approximately zero to approximately 100,000 Hz) of a drive impedance $Z_{EM}(s)$ without kernel shaping, a drive impedance $Z_{EM\_shaped}(s)$ with kernel shaping and a load impedance $Z_{CL}(s)$ according to an example embodiment. The magnitude of the drive impedance $Z_{EM}(s)$ without impedance shaping intersects with the magnitude of the load impedance $Z_{CL}(s)$ at around 100 Hz and 300 Hz and then the magnitude of the load impedance $Z_{CL}(s)$ becomes smaller than the magnitude of the drive impedance $Z_{EM}(s)$ and anti-resonance at around 250 Hz. However, as shown, the controller is configured to provide impedance shaping according to some example embodiments in accordance with an impedance control parameter (e.g., kernel impedance control parameter), such as a targeted kernel impedance (response or curve) $Z_K(s)$ to shape $Z_{EM}(s)$ (i.e., $Z_{EM\_shaped}(s)$) such that $Z_{CL}(s) > Z_{EM\_shaped}(s)$ for the magnitude of the complete frequency response function without the need to modify the magnitude of the load impedance $Z_{CL}(s)$ versus frequency, which may be fixed or subject to constrained operating conditions associated with the mechanical load. As shown, the magnitude of the frequency response function of a drive impedance with impedance shaping $Z_{EM\_shaped}(s)$ does not intersect the magnitude of the frequency response function of the load impedance $Z_{CL}(s)$ due to the kernel impedance $Z_K(s)$.

In some example embodiments such as in FIGS. 2-3 and 5, the kernel impedance $Z_K(s)$ is $$Z_K(s) = K_{HF} \frac{\left(1 + \frac{\omega_{z1}}{s}\right)\left(1 + \frac{\omega_{z2}}{s}\right)\left(1 + \frac{\omega_{z3}}{s}\right)}{\left(1 + \frac{\omega_{p1}}{s}\right)\left(1 + \frac{\omega_{p2}}{s}\right)\left(1 + \frac{\omega_{p3}}{s}\right)} \quad (11)$$

where $K_{HF}$ is a high frequency impedance value and is static once implemented on the controller.

Setting the impedance $K_{HF}$ as a high frequency gain enforces separation in and around an anti-resonance frequency. The impedance $K_{HF}$ may be set based on the system and empirical data.

A first zero frequency $\omega_{z1}$ are set at an anti-resonance frequency of 250 Hz and subsequent zeros $\omega_{z2}$ and $\omega_{z3}$ are at half and a third of the first zero frequency $\omega_{z1}$, respectively. Similarly, a first pole frequency $\omega_{p1}$ is determined to be lower than a bandwidth of the speed controller 132 (e.g., 35 Hz) such as 20 Hz and subsequent poles $\omega_{p2}$ and $\omega_{p3}$ are set at half and a third of the first pole frequency $\omega_{p1}$, respectively.

In general, a transfer function like $Z_K(s)$ shown above has a numerator and denominator. The numerator has the zeros of the transfer function, meaning at those frequencies the output is zero. Similarly, the denominator has the poles of the transfer function and they become zero at specific frequencies.

The separation of pole/zero frequencies permits for a relatively smoother change in impedance. Moreover, the separation of the pole frequencies determines the DC gain of the kernel impedance. Spacing of the pole frequencies may be adjusted to preserve an original drive impedance from DC to mid-band frequencies.

As describe above, an impedance analysis decomposes an overall system into products of open and closed loop gains. A graphical impedance based analysis as shown in FIG. 5 shows that as long as a clear separation between $Z_{EM}$ and $Z_{CL}$ exists, the closed loop interconnection gain is unity, thus removing the need for deriving higher order transfer functions that may be used for further analysis and evaluation. The partitioning of the overall system enables analysis of a sixth order system into two systems where the drive is a fourth order system and the load a second order system. This approach enables system designers to have more flexibility during the design process as the interconnection properties for the drive and the load maybe co-designed. Instances where the load properties are unknown, drive designers can still provide specifications in terms of the desired properties for the load impedance to maintain separation between $Z_{EM}$ and $Z_{CL}$. Impedance based analysis enables visualization of non-unity negative feedback loops as impedances in parallel with forward path impedance. Moreover, loads connected to the electric machine can also be represented as parallel impedances. The parallel impedance approach augments a graphical impedance based approach thus removing the need of tedious block diagram analysis.

Figure 6:
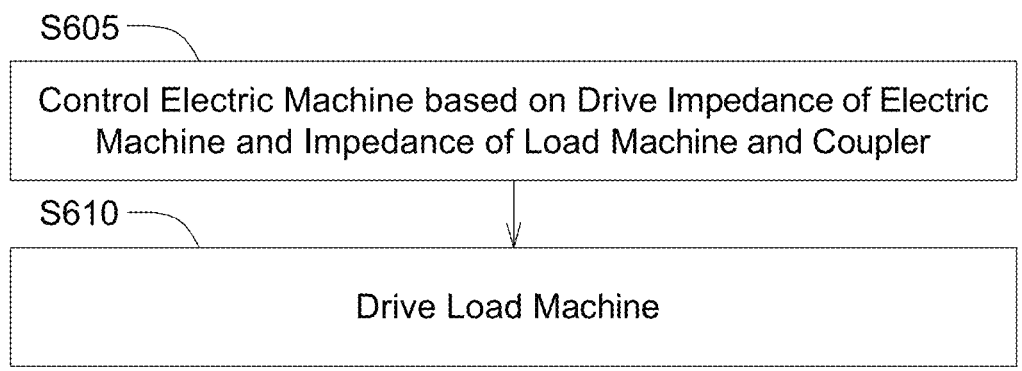
FIG. 6 illustrates a method of driving a load machine according to an example embodiment.

FIG. 6 illustrates a method of driving a load machine according to one or more example embodiments. The method of FIG. 6 may be performed by the electric drive shown in FIG. 1.

At S605, a controller (e.g., the controller 110) controls an electric machine based on an identified drive impedance of the electric machine and an identified impedance of the load machine and a coupler.

In an example embodiment and as described above, the controlling controls the electric machine further based on a feedback impedance, e.g., the feedback impedance $Z_K(s)$.

In an example embodiment, the controlling includes determining the identified drive impedance of the electric machine (e.g., drive impedance $Z_{EM}(s)$) based on a first impedance of the electric machine (e.g., the impedance $Z_{JM}$) and the feedback impedance (e.g., $Z_K(s)$).

In an example embodiment, the controlling includes determining frequencies (e.g., zero frequencies $\omega_{z1}$, $\omega_{z2}$ and $\omega_{z3}$ and pole frequencies $\omega_{p1}$, $\omega_{p2}$ and $\omega_{p3}$) at which a frequency response function (FRF) of the drive impedance of the electric machine and a FRF of the identified impedance of the load machine and a coupler cross, and determining the identified drive impedance based on the determined frequencies. The controller determines the drive impedance such that a magnitude across the FRF of the determined impedance does not cross a magnitude of the FRF of the identified impedance of the load machine and the coupler.

At S610, the controller drives the load machine based on the control of the electric machine. More specifically, the controller controls the electric machine to drive the load machine through a coupler.

Figure 7:
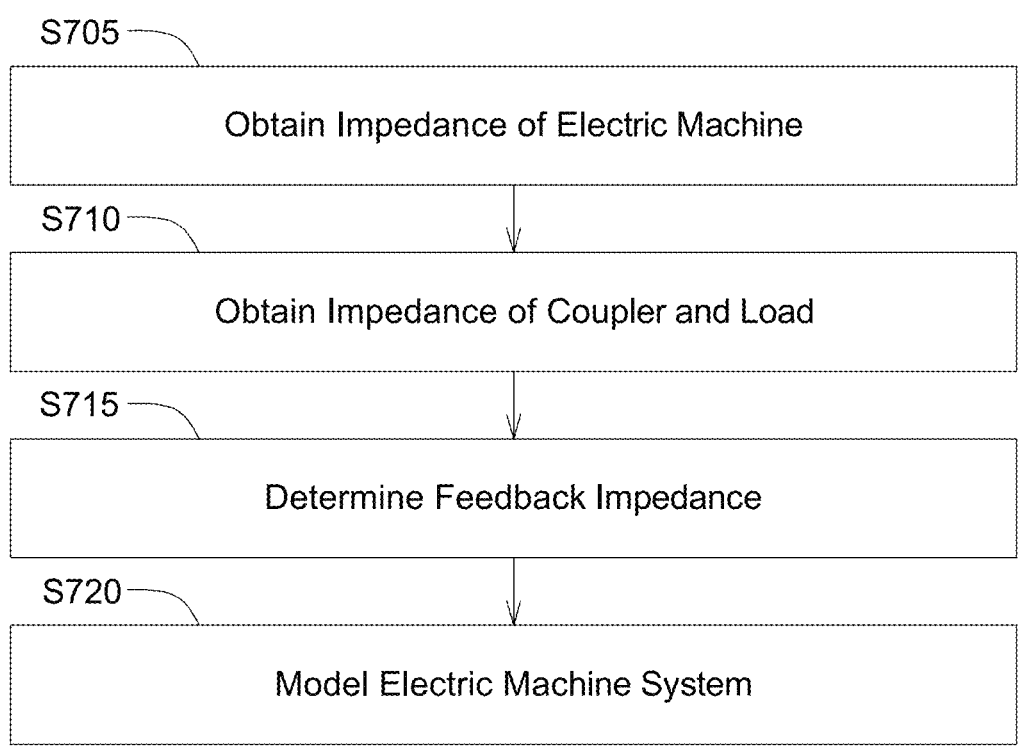
FIG. 7 illustrates a method of modeling an electric machine system according to an example embodiment.

FIG. 7 illustrates a method of modeling an electric machine system according to one or more example embodiments. The electric machine system may be the system shown in FIGS. 1-2.

At S705, an impedance of an electric machine (e.g., $Z_{EM}$) is obtained by a controller.

At S710, an impedance of a coupler and a load machine (e.g., $Z_{CL}$) is obtained by the controller.

At S715, a feedback impedance (e.g., $Z_K$) is determined. For example, the feedback impedance may be determined by the controller.

As S720, the controller models the electric machine system based on the impedance of the electric machine, the impedance of the coupler and the load and the feedback impedance. For example, the feedback impedance is determined such that a magnitude of the FRF of the impedance of the electric machine does not cross a magnitude of the FRF of the impedance of the load machine and the coupler.

In an example embodiment, the controlling includes determining frequencies (e.g., zero frequencies $\omega_{z1}$, $\omega_{z2}$ and $\omega_{z3}$ and pole frequencies $\omega_{p1}$, $\omega_{p2}$ and $\omega_{p3}$) at which a frequency response function (FRF) of the drive impedance of the electric machine and a FRF of the impedance of the load machine and the coupler cross, and determining the drive impedance based on the determined frequencies. The controller determines the drive impedance such that a FRF of the determined impedance does not cross the FRF of the impedance of the load machine and the coupler.

At S610, the controller drives the load machine based on the control of the electric machine. More specifically, the controller controls the electric machine to drive the load machine through a coupler.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

It will be understood that when an element is referred to as being "connected" or "coupled" to another element, it may be directly connected or coupled to the other element or intervening elements may be present. As used herein the term "and/or" includes any and all combinations of one or more of the associated listed items.

The invention claimed is:

1. A system comprising:
   a load machine;
   a coupler;
   an electric machine coupled to the load machine via the coupler and configured to drive the load machine; and
   a controller configured to
      model the electric machine based on a drive impedance of the electric machine and an impedance of the load machine and the coupler, and
      control the electric machine based on the model.

2. The system of claim 1, wherein the controller is configured to control the electric machine further based on a feedback impedance.

3. The system of claim 2, wherein the controller is configured to determine the drive impedance of the electric machine based on a first impedance of the electric machine and the feedback impedance.

4. The system of claim 3, wherein the controller is configured to,
   determine crossing frequencies at which a magnitude of a frequency response function (FRF) of the drive impedance of the electric machine and a magnitude of a FRF of the impedance of the load machine and the coupler cross each other, and
   determine the drive impedance based on the determined crossing frequencies.

5. The system of claim 4, wherein the controller is configured to determine the drive impedance such that a magnitude of the FRF of the determined drive impedance does not cross the magnitude of the FRF of the impedance of the load machine and the coupler.

6. The system of claim 2, wherein the feedback impedance is:

$$Z_K(s) = K_{HF} \frac{\left(1 + \frac{\omega_{z1}}{s}\right)\left(1 + \frac{\omega_{z2}}{s}\right)\left(1 + \frac{\omega_{z3}}{s}\right)}{\left(1 + \frac{\omega_{p1}}{s}\right)\left(1 + \frac{\omega_{p2}}{s}\right)\left(1 + \frac{\omega_{p3}}{s}\right)}$$

wherein $K_{HF}$ is a frequency gain, $\omega_{z1}$-$\omega_{z3}$ are zero frequencies and $\omega_{p1}$-$\omega_{p3}$ are pole frequencies.

7. A method comprising:
   modelling an electric machine based on an identified drive impedance of the electric machine and an identified impedance of a load machine and a coupler; and
   driving the load machine based on the model.

8. The method of claim 7, wherein the modelling the electric machine is further based on a feedback impedance.

9. The method of claim 8, wherein the modelling includes,
   determining the identified drive impedance of the electric machine based on a first impedance of the electric machine and the feedback impedance.

10. The method of claim 9, wherein the modelling includes,
    determining crossing frequencies at which a magnitude of a frequency response function (FRF) of the drive impedance of the electric machine and a magnitude of a FRF of the impedance of the load machine and the coupler cross each other, and
    determining the identified drive impedance based on the determined crossing frequencies.

11. The method of claim 10, wherein the determining the identified drive impedance determines the identified drive impedance such that a FRF of the identified drive impedance does not cross the FRF of the identified impedance of the load machine and the coupler.

12. The method of claim 8, wherein the feedback impedance is:

$$Z_K(s) = K_{HF} \frac{\left(1 + \frac{\omega_{z1}}{s}\right)\left(1 + \frac{\omega_{z2}}{s}\right)\left(1 + \frac{\omega_{z3}}{s}\right)}{\left(1 + \frac{\omega_{p1}}{s}\right)\left(1 + \frac{\omega_{p2}}{s}\right)\left(1 + \frac{\omega_{p3}}{s}\right)}$$

wherein $K_{HF}$ is a frequency gain, $\omega_{z1}$-$\omega_{z3}$ are zero frequencies and $\omega_{p1}$-$\omega_{p3}$ are pole frequencies.

13. A method of modeling an electric machine system, the method comprising:
    obtaining an impedance of an electric machine;
    obtaining an impedance of a coupler and a load machine;
    determining a feedback impedance; and
    modeling the electric machine system based on the impedance of the electric machine, the impedance of the coupler and the load machine and the feedback impedance.

14. The method of claim 13, wherein the modeling includes,
    shaping the impedance of the electric machine to be lower than the impedance of the coupler and the load machine based on the feedback impedance.

15. The method of claim 14, wherein the determining the feedback impedance determines the feedback impedance as:

$$Z_K(s) = K_{HF} \frac{\left(1 + \frac{\omega_{z1}}{s}\right)\left(1 + \frac{\omega_{z2}}{s}\right)\left(1 + \frac{\omega_{z3}}{s}\right)}{\left(1 + \frac{\omega_{p1}}{s}\right)\left(1 + \frac{\omega_{p2}}{s}\right)\left(1 + \frac{\omega_{p3}}{s}\right)}$$

wherein $K_{HF}$ is a frequency gain, $\omega_{z1}$-$\omega_{z3}$ are zero frequencies and $\omega_{p1}$-$\omega_{p3}$ are pole frequencies.

16. A system comprising:
    a load machine;
    a coupler;
    an electric machine coupled to the load machine via the coupler and configured to drive the load machine; and
    a controller configured to control the electric machine based on a drive impedance of the electric machine, an impedance of the load machine and the coupler, and a feedback impedance.

17. A method comprising:
    controlling an electric machine based on an identified drive impedance of the electric machine, an identified impedance of a load machine and a coupler, and a feedback impedance; and
    driving the load machine based on the control.

* * * * *